March 4, 1952  E. C. DOEPKER  2,587,980
DRILL
Filed April 14, 1947  2 SHEETS—SHEET 1

INVENTOR.
ERVIN C. DOEPKER
BY
Whittemore, Hulbert
& Belknap  ATTORNEYS

March 4, 1952 — E. C. DOEPKER — 2,587,980
DRILL
Filed April 14, 1947 — 2 SHEETS—SHEET 2

INVENTOR.
ERVIN C. DOEPKER
BY Whittemore, Hulbert & Belknap
ATTORNEYS

Patented Mar. 4, 1952

2,587,980

UNITED STATES PATENT OFFICE 2,587,980

DRILL

Ervin C. Doepker, New Hudson, Mich., assignor to National Tool Salvage Company, Detroit, Mich., a corporation of Michigan Application April 14, 1947, Serial No. 741,323

7 Claims. (Cl. 77—67)

The present invention relates to a drill and has particular utility when formed of a hard cutting material, such for example as tungsten carbide.

It is an object of the present invention to provide a drill characterized by the cutting action which extends completely to the axis of the drill.

It is a further object of the present invention to provide a drill characterized by its freedom from tendency to drift out of alignment during the drilling operation.

It is a further object of the present invention to provide a drill preferably formed of tungsten carbide or the like characterized by its freedom of cut, its accuracy in maintaining alignment and its long life.

It is a further object of the present invention to provide a drill adapted to perform its own centering operation, which will drill an accurately round hole, which will locate accurately, which will maintain its sharpness over a long period of time, which has maximum strength at points of maximum stress, which is designed so that all cutting edges tend to wear equally and thus to avoid unequal dulling, which will drill high-speed steel Rockwell C-62-64 consistently and with ease, which will throw a chip instead of burning out, which cuts with sufficient freeness so that annealing of the areas adjacent the cut is avoided, and which further cuts sufficiently freely so that it may be employed either with or without coolant, as desired.

It is a feature of the present invention to provide a drill preferably formed of a material such as tungsten carbide in which two diametrically opposed cutting ribs are provided, each of which has a cutting edge which extends to the axis of the cutter.

It is a further feature of the present invention to provide a drill preferably formed of a material such as tungsten carbide which has a cutting portion provided with two diametrically opposed cutting ribs, each of which is provided with two cutting edges, the two innermost cutting edges of the four cutting edges thus provided intersecting at the axis of the drill and the two outer cutting edges intersecting the adjacent inner cutting edges.

Other objects and features of the invention will become apparent as the description proceeds, especially when considered in conjunction with the accompanying drawings, wherein.

Figure 3:
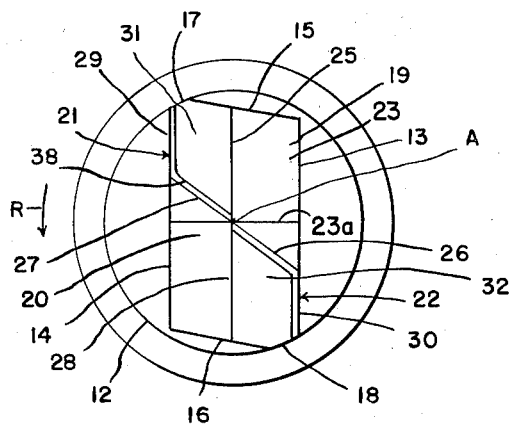
Figure 3 is a plan view of the drill illustrated in Figure 1.
Figure 1:
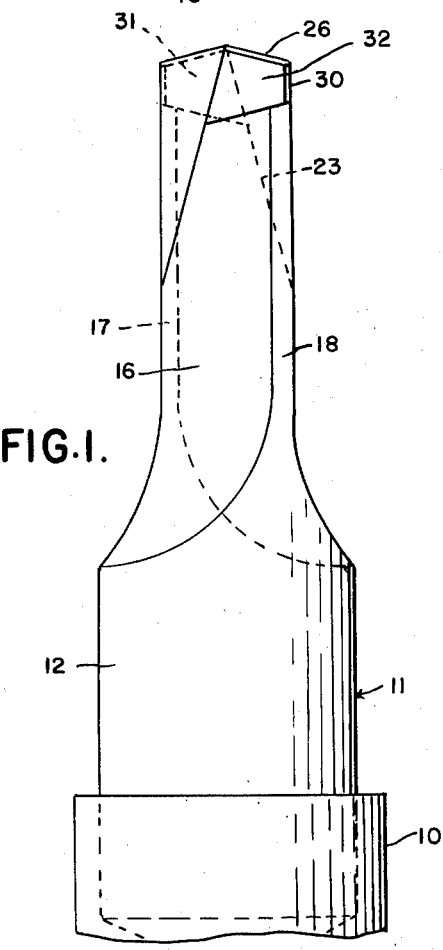
Figure 1 is a front elevation of a drill constructed in accordance with the present invention.
Figure 2:
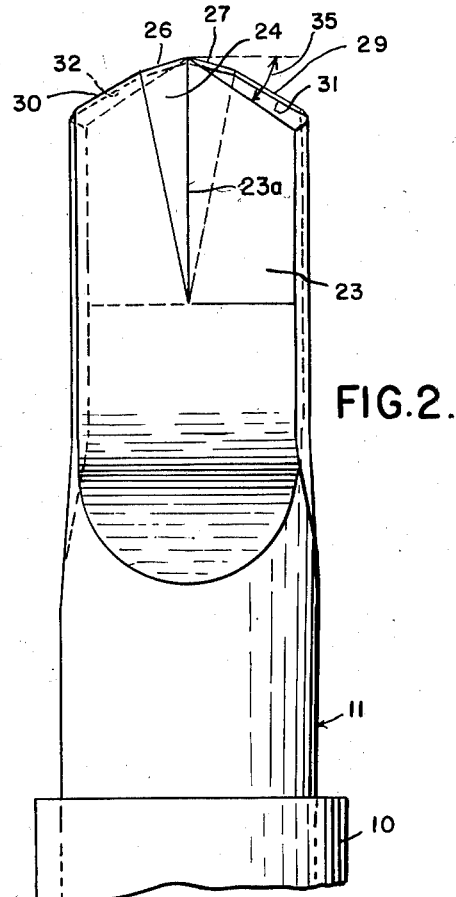
Figure 2 is a side elevation of the drill illustrated in Figure 1.

Referring first to Figures 1 to 3, there is illustrated a drill comprising a holder 10 preferably of steel and a drill tip 11 mounted in the steel holder preferably by brazing as is well known in the art. The lower portion 12 of the drill tip is cylindrical and the cutting portion has a cross-sectional shape which is generally a parallelogram, as illustrated best in Figure 3. The cutting portion has flat side walls 13 and 14 and flat end or edge walls 15 and 16. End wall 15 and side wall 14 do not intersect but instead leave a small cylindrical guiding land 17 and a similar land 18 is left between side wall 13 and end wall 16. Diametrically opposite portions at the corners of the drill intersected by the minor diagonal thereof are ground away to provide flutes as indicated at 19 and 20 to leave two diametrically opposite cutting ribs 21 and 22. As best seen in Figures 1 and 2, the ground away portion at 19 leaves an inclined side surface or wall 23 and a second angularly disposed side surface or wall 24, which walls intersect along line 23a. Since the line 23a defines the bottom or root of a flute it may be referred to as the root line thereof. The wall 23 intersects the end surface of the drill along the line 25 and the wall 24 intersects the end surface of the drill along the line 26. In like manner, the ground away portion 20 provides surfaces which intersect the end surface of the drill along the lines 27 and 28. The rib 21 includes a top edge 29 and the rib 22 includes a top edge 30. The drill illustrated is a right-hand drill intended for rotation in the direction of the arrow R in Figure 3, and the top edges 29 and 30 and the top edges 26 and 27 are cutting edges.

In order to provide cutting clearance in back of the cutting edges 26, 27, 29 and 30, the end or top surfaces 31 and 32 of the ribs 21 and 22, respectively, are inclined at a compound angle. Since the two ribs 21 and 22 are identical and are symmetrically disposed with respect to the axis of the cutter, only the rib 21 will be further described. The top surface 31 of the rib 21 is inclined to the axis of the drill at a substantial angle, as for example the angle 35 in Figure 2. It will thus be seen that the root lines 23a defined by the intersection between the side surfaces 23 and 24 intersect substantially at the point A on the axis of the drill, and further that the inclined end surfaces 31 and 32 also intersect at the same point A. In order to provide cutting clearance in back of the cutting edges 27 and 29, the plane of the top surface 31 is further inclined rearwardly from the cutting edges as well illustrated in Figures 1 and 2. If desired, either or both of the pairs of cutting edges 26, 27 and 29, 30 may be ground to provide a narrow band 38, this reference numeral being applied to the cutting edge 27 in Figure 3. The purpose of this band is to provide a cutting edge having a precisely predetermined amount of clearance in back of the cutting edge which may be at a smaller angle than the top surface of the respective cutting rib. In some cases, depending upon the angles at which the top surfaces 31 and 32 are disposed, it may be unnecessary to provide additional modification of the cutting edges.

Attention is particularly directed to the fact that the inner cutting edges 26 and 27 intersect at a point A which lies upon the axis of the drill and therefore each of these cutting edges is adapted to perform its cutting operation completely to the axis of the drill so that material is removed from the work piece entirely by a free cutting operation without the necessity of crushing or otherwise acting upon a central core in the drill hole.

In the embodiment illustrated in Figures 1 to 3, the inner cutting edges 26 and 27 occupy a plane containing the axis of the drill and are inclined in such plane symmetrically with respect to the axis of the drill. More specifically, cutting edges 26 and 27 are inclined rearwardly of the drill from their point of intersection on the axis thereof.

The adjacent or intersecting portions of the cutting ribs 21 and 22 are sector shaped and are diametrically and symmetrically disposed with respect to the axis of the drill. The included angle at the axis of the drill between the adjacent side walls of the cutting ribs is illustrated as being substantially less than 90°.

Figure 6:
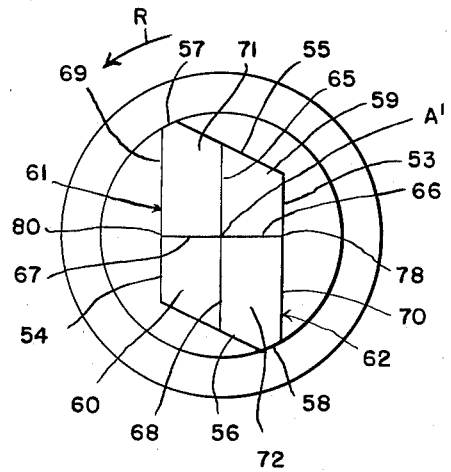
Figure 6 is a plan view of the drill shown in Figure 4.
Figure 4:
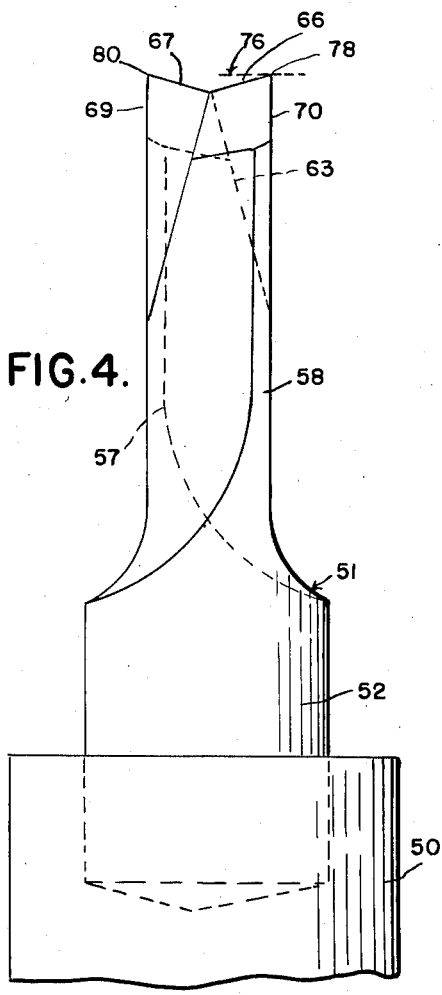
Figure 4 is a front elevation of a second embodiment of the present invention.
Figure 5:
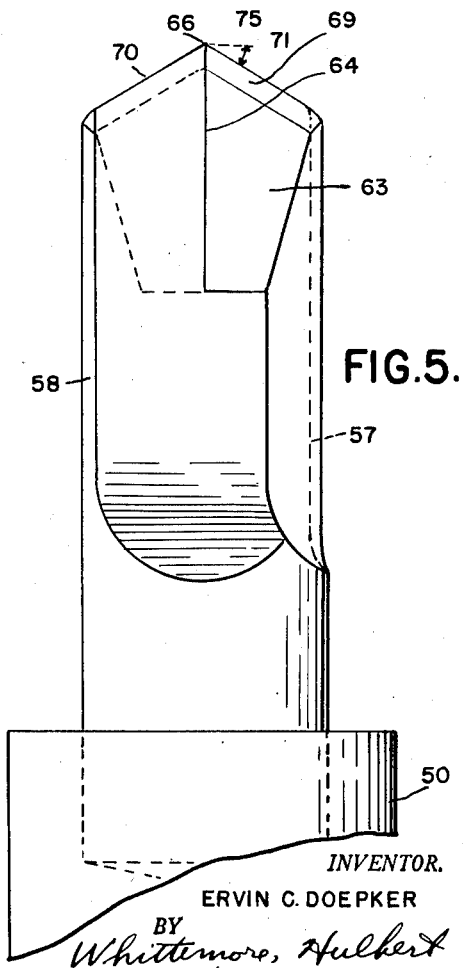
Figure 5 is a side elevation of the drill shown in Figure 4.

The included angle at the intersecting portions of the ribs may, however, be otherwise than as shown in Figures 1 and 3, and attention is now directed to a second embodiment of the invention illustrated in Figures 4, 5 and 6.

In these figures there is illustrated a drill comprising a holder 50 preferably of steel and a drill tip 51 mounted in the steel holder preferably by brazing as is well known in the art. The lower portion 52 of the drill tip is cylindrical and the cutting portion has a cross-sectional shape which is generally a parallelogram, as illustrated best in Figure 6. The cutting portion has flat side walls 53 and 54 and flat end walls 55 and 56. End wall 55 and side wall 54 do not intersect but instead leave a small cylindrical guiding land 57 and a similar land 58 is left between side wall 53 and end wall 56. Diametrically opposite portions at the tip of the drill are ground away to provide flutes as indicated at 59 and 60 to leave two diametrically opposite cutting ribs 61 and 62. As best seen in Figures 4 and 5, the ground away portion at 59 leaves an inclined wall 63 and a second angularly disposed wall 64. The wall 63 intersects the end surface of the drill along the line 65 and the wall 64 intersects the end surface of the drill along the line 66. In like manner, the ground away portion 60 provides surfaces which intersect the end surface of the drill along the lines 67 and 68. The rib 61 includes a top edge 69 and the rib 62 includes a top edge 70. The drill illustrated is a right-hand drill intended for rotation in the direction of the arrow R in Figure 6 and the top edges 69 and 70 and the top edges 66 and 67 are cutting edges.

In order to provide cutting clearance in back of the cutting edges 66, 67, 69 and 70, the top surfaces 71 and 72 of the ribs 61 and 62, respectively, are inclined at a compound angle. Since the two ribs 61 and 62 are identical and are symmetrically disposed with respect to the axis of the cutter, only the rib 61 will be further described. The top surface 71 of the rib 61 is inclined to the axis of the drill at a substantial angle, as for example the angle 75 in Figure 5. In order to provide cutting clearance in back of the cutting edges 67 and 69, the plane of the top surface 71 is further inclined in a direction perpendicular to the inclination thus far described by an additional angle which appears as the angle 76 in Figure 4. If desired, either or both of the pairs of cutting edges 66, 67 and 69, 70 may be ground to provide a narrow band similar to the band 38 shown in Figure 3. However, this modification of the cutting edges is not illustrated in the embodiment shown in Figures 4 to 6.

Attention is particularly directed to the fact that the inner cutting edges 66 and 67 intersect at a point A' which lies upon the axis of the drill, and therefore each of these cutting edges is adapted to perform its cutting operation completely to the axis of the drill so that material is removed from the work piece entirely by a free cutting operation without the necessity of crushing or otherwise acting upon a central core in the drill hole.

In the present embodiment the ribs 61 and 62 intersect in sector-shaped portions at the axis of the drill, and it will be observed in Figure 6 that the included angle between the adjacent side corners of the ribs in this instance is illustrated as being approximately 90°. As a result of the disposition of the cutting edges 66 and 67 at right angles to the side walls 53 and 54, the compounded top surfaces 71 and 72 of the ribs 61 and 62, respectively, result in the cutting edges 66 and 67 being symmetrically inclined forwardly from the axis of the drill with respect to a plane perpendicular to the axis of the drill. The cutting edge 66 therefore intersects the cutting edge 70 at a point 78 which therefore projects forwardly beyond the central portion of the drill. In like manner, cutting edges 67 and 69 intersect at a point 80 which occupies the same normal plane as the point 78. Accordingly, the drill when presented to a flat work piece contacts the work piece first by its corners 78 and 80, and these corners during the initial half turn scribe a circle on the work piece. Thereafter cutting proceeds both toward the center of the drill and outwardly toward the periphery thereof until the cutting edges are all engaged along their full length. At this time cutting edges 66 and 67 cut completely to the axis of the drill hole, thus providing for free cut, avoiding any crushing action at the center of the drill hole and tending to maintain a straight line cut without deviation from the desired direction.

Comprising the embodiments illustrated in Figures 1 to 3 and Figures 4 to 6, it will be observed that the principal difference is that the inner pair of cutting edges in the first instance inclines rearwardly from their point of intersection on the axis of the drill, whereas in the second case the inner pair of cutting edges inclines forwardly of the drill from the point of intersection on its axis. By a proper selection of angularity of the inner cutting edges with respect to the side and end walls of the parallelogram-shaped shank and the compound angle at which the top surfaces of the lands are provided, the inner pair of cutting edges may incline forwardly or rearwardly, as desired, or may occupy a plane perpendicular to the axis of the drill. In the embodiment of the invention illustrated in Figures 1 to 3, the two cutting edges provided on a single rib intersect at an obtuse angle, whereas in the embodiment illustrated in Figures 4 to 6 the corresponding cutting edges intersect at a right angle. Inasmuch as the intersection of these cutting edges at an obtuse angle, as best illustrated in Figure 3, results in a somewhat stronger construction, this is ordinarily preferred. However, in some cases it may be desirable to provide the cutting edges and top inclined surfaces in such relationship with respect to each other as to provide the pair of initially contacting cutting corners such as the corners 78 and 80 illustrated in Figures 4 to 6.

The drills embodying the structural features of the present invention where constructed in accordance with the specific arrangement illustrated in Figures 1 to 3 or Figures 4 to 6 have exhibited unusual accuracy in maintaining the line of cut without drift and have further demonstrated their ability to stand up under difficult cutting conditions, such for example as cutting hardened tool steel, for long periods of time.

Drills constructed in accordance with the present invention are provided with two leading or inner cutting edges which will center the drill accurately at the start of the cut and will thus avoid the necessity for providing a centering recess before starting the drilling operation.

As previously stated, the two inner cutting edges actually meet or intersect at the point of the drill or on the axis of the drill, and accordingly they cut all the way to the center leaving no dead space. This prevents the tendency to weave, which is so noticeable in prior conventional drills, and enables the drilling of accurately located and perfectly round and true holes even under adverse drilling conditions, such as drilling high-speed steel having a Rockwell hardness of C-62-66.

Another important advantage of the present invention resides in the provision of four distinct cutting edges so that the chip formed at each side of the center splits and is therefore easier to dispose of. This four-edge construction further provides for maximum strength where strength is needed.

Prior conventional practice ordinarily provides cutting edges which do not extend completely to the center of the drill, and accordingly there is left a small core at the center which can only be removed by crushing or otherwise than by cutting. The present drill cuts very freely completely to the center of the hole being drilled and therefore the cutting operation is carried out without a tendency to heat to an undesirable degree, thereby permitting high-speed drilling to be carried out without a tendency to anneal or draw the material of the work. It follows from the same considerations that the drill may be employed even at high speed in drilling high-speed steel of high hardness without a coolant, if desired.

In both embodiments illustrated herein the flutes are so shaped as to provide proper front rake and efficient metal cutting. In the embodiment illustrated in Figures 1-3 the front rake for the cutting edges 26 and 27 is determined by the inclination of the surface 24 which as will be apparent from an inspection of the figures is a small negative rake angle. The front rake provided for the cutting edges 66 and 67 is determined by the inclination of the wall 64 which as clearly apparent from an inspection of the figures provides a zero rake angle. In both cases the outer cutting edges 29 and 30 and 69 and 70 have a front rake angle of zero degrees. Obviously these front rake angles of both the inner and outer cutting edges may be slightly changed but it is important in all cases that the front rake angle of all cutting edges shall be such as to provide efficient metal cutting. It is well known that efficient metal cutting may take place with relatively large negative rake angles. However, and as is well understood in the art, when the negative rake angle becomes too large efficient metal cutting is not obtained and inefficient scraping action takes place. In the present case where a front rake angle suitable for efficient metal cutting is referred to, the intention is to define a front rake angle which results in the removal of actual chips.

In both of the specific embodiments illustrated herein it will be observed that the inner cutting edges are oppositely facing and radially disposed. Accordingly, these cutting edges have a zero shear angle. In addition, the inner cutting edges are provided with top cutting clearance and with a suitable front rake for efficient metal cutting as previously described. The outer cutting edges in both specific embodiments herein illustrated are angularly disposed with respect to the inner cutting edges which they intersect so as to have a positive shear angle. As illustrated herein and in both embodiments, the outer cutting edges are illustrated as provided with substantially zero front rake, although this may be suitably modified as will be apparent to those skilled in the art. In addition, the outer cutting edges are provided with suitable top clearance.

While I have illustrated and described two specifically different embodiments of my improved drill, it will be understood that this specific illustration and description has been presented merely to enable those skilled in the art to practice the invention, the true scope of which is indicated by the appended claims.

What I claim as my invention is:

1. A drill having a cutting body whose normal cross-section is substantially a parallelogram having major and minor diagonals, said body having side walls and edge walls, said drill having flutes at the end corners thereof intersected by the minor diagonal, each of said flutes being defined by two intersecting side surfaces one of which intersects the adjacent edge wall and the other of which intersects the adjacent side wall of the body, the root line formed by the intersection of said side surfaces of the flute extending obliquely inwardly of the body from an intermediate point on the side wall of said body and intersecting the end surfaces of the body and the corresponding root line of the other flute at a point substantially on the axis of said drill, the end of said body consisting of two angularly disposed surfaces each of which is bounded by its intersection with a side wall and edge wall of said body and one side surface of each of said flutes, said end surfaces intersecting each other substantially on the axis of said drill at the point of intersection of said root lines, each of said end surfaces defining a first radial cutting edge at its intersection with the side surface of the flute which extends inwardly from the side wall of said body and a second cutting edge at its intersection with the side wall of said body, each of said end surfaces being inclined at an angle to produce cutting clearance in back of both of said cutting edges.

2. A drill as defined in claim 1 in which the radial cutting edges formed by the intersection of the end surfaces and the flute surfaces are inclined rearwardly from the axis of the drill to define a locating point at the axis thereof, and the remaining cutting edges are inclined rearwardly from their point of intersection with the first mentioned cutting edges at angles greater than the inclination of said radial cutting edges.

3. A drill as defined in claim 2 in which the surfaces of the flutes which intersect the end surfaces of the drill to form cutting edges are inclined to produce negative rake for these cutting edges.

4. A drill as defined in claim 3 in which the body has flat side and edge walls.

5. A drill as defined in claim 1 in which the side surfaces of the flutes are planar.

6. A drill as defined in claim 1 in which the end surfaces of the drill are planar.

7. A drill as defined in claim 1 in which the end surfaces of the drill and the side surfaces of the flutes are all planar.

ERVIN C. DOEPKER.

REFERENCES CITED

The following references are of record in the file of this patent:

UNITED STATES PATENTS

| Number | Name | Date |
|---|---|---|
| 546,041 | Tyberg | Sept. 10, 1895 |
| 796,321 | Granberg | Aug. 1, 1905 |
| 984,323 | Vauclain | Feb. 14, 1911 |
| 1,069,930 | Down | Aug. 12, 1913 |
| 1,847,302 | Emmons | Mar. 1, 1932 |
| 2,260,288 | Black | Oct. 28, 1941 |
| 2,334,089 | Hallden | Nov. 9, 1943 |
| 2,354,985 | Davis | Aug. 1, 1944 |

FOREIGN PATENTS

| Number | Country | Date |
|---|---|---|
| 714,611 | France | Nov. 17, 1931 |
| 873,752 | France | July 20, 1942 |

OTHER REFERENCES

Cleveland Twist Drill Co., Cleveland, Ohio, Catalog No. 42, page 196, Figures 10 and 11.